March 20, 1951 — F. E. J. GIRLING — 2,546,065

CATHODE-RAY TUBE TIME BASE

Filed July 31, 1947 — 4 Sheets-Sheet 1

F. E. J. Girling
Inventor
By
Attorney

March 20, 1951

F. E. J. GIRLING 2,546,065

CATHODE-RAY TUBE TIME BASE

Filed July 31, 1947

4 Sheets—Sheet 2

F. E. J. Girling
Inventor

By Nelson Moore
Attorney

UNITED STATES PATENT OFFICE 2,546,065

CATHODE-RAY TUBE TIME BASE

Frank Edward Jex Girling, Malvern, England

Application July 31, 1947, Serial No. 765,199
In Great Britain October 23, 1945

Section 1, Public Law 690, August 8, 1946
Patent expires April 23, 1965

10 Claims. (Cl. 315—26)

This invention relates to electronic valve circuits and particularly to circuits used in pulsed radar sets. Such radar sets produce recurrent pulses of radio frequency energy, and locking pulses which include a voltage front coincident with the transmitted pulse. When following a target either manually or automatically the radar set may also produce a voltage pulse or step, usually referred to as a "strobe," at a time delay corresponding to the radar echo delay. A presentation unit may be fed with rectified signals, locking pulses and strobes, and may be required to provide a display in which the signal being followed, at whatever range it may be, shall appear at the middle of a fast portion of the trace.

The invention therefore comprises a time base circuit adapted to produce a recurrent time base voltage sweep initiated in synchronism with a recurrent input voltage front, and arranged to reach a predetermined voltage at the time of a recurrent input occurrence having a fixed or slowly-varying time delay relative to said input voltage front, said means comprising an electronic valve circuit which, in the event of said time delay varying, tends to reduce any discrepancy between the delayed input occurrence and the time when the time base voltage reaches the predetermined voltage. The invention also comprises a cathode ray tube display system including means for producing a slow time base sweep in one direction starting coincident with a recurrent voltage locking front, and means for also producing a fast time base voltage sweep of substantially shorter duration in the opposite direction, means for applying the said voltage sweeps to the opposite deflecting plates of a cathode ray tube to produce a sweep of the spot on the screen having a fast portion, and means for automatically timing the fast sweep so that a repetitive input occurence, which has a fixed or slowly-varying delay from the locking front, will always correspond to substantially the same position in the fast portion.

Figure 1:
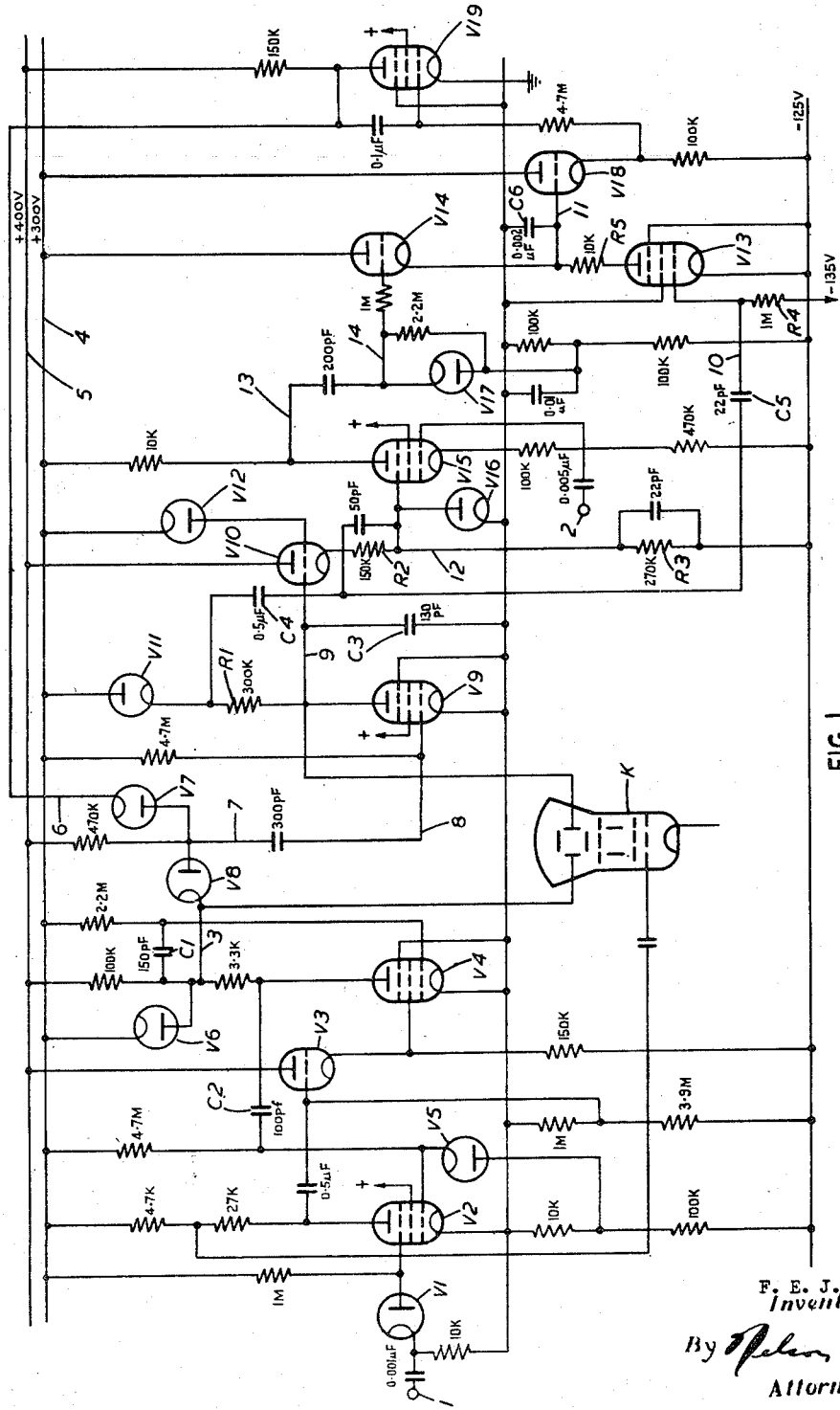
Figure 2:
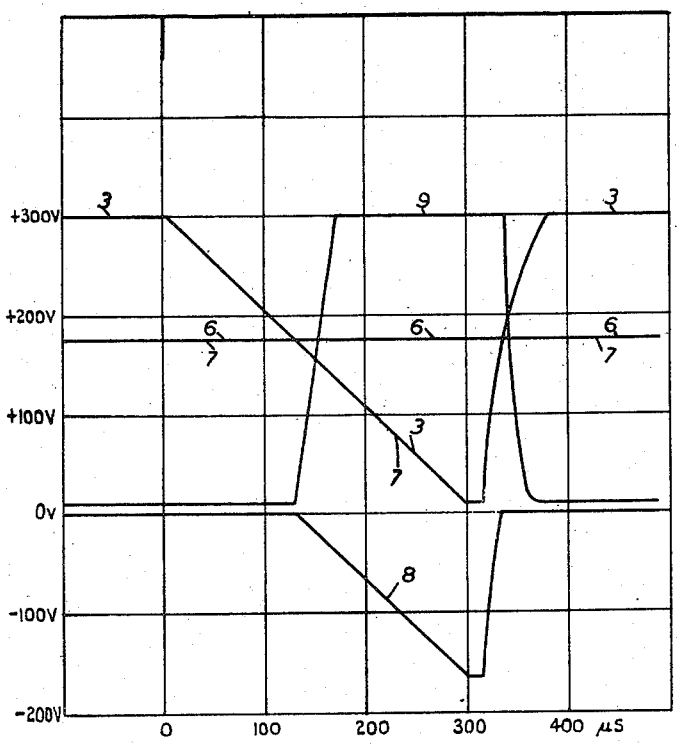

Figure 1 of the accompanying drawings shows a circuit according to the invention and Figure 2 shows the waveforms appearing at various parts of this circuit, the waveforms in Fig. 2 bearing the same reference numbers as the points where they occur bear in Fig. 1. Negative locking pulses are fed in at 1, and in consequence a negative-going time base sweep is obtained at 3 for application to one deflecting plate of a cathode ray tube K. A fast portion is caused to appear in the trace on the screen of the C. R. tube by a rapid positive-going time base sweep of shorter duration generated at 9 and applied to the opposite deflecting plate. The strobe pulse is fed in at 2 and the fast portion is so timed that it always includes the radar strobe.

The operation will now be described in greater detail.

The circuit using the values shown has been found to operate at a recurrence up to 1000 c./s. and the fast portion locks satisfactorily on to a delayed positive strobe of 1 microsecond duration delayed by up to about 300 microseconds behind the locking pulse.

The symbols Ω K and M indicate respectively ohms, thousands of ohms, and megohms. The valve types are as shown in the table below. Double diodes and double triodes, types VR54 and CV181 respectively have been freely used. These types include two separate valves in the same envelope, and each half is indicated in the table by ½VR54 and ½CV181.

| V1  | ½VR54  | V11 | ½VR54  |
|-----|--------|-----|--------|
| V2  | VR116  | V12 | ½VR54  |
| V3  | ½CV181 | V13 | VR116  |
| V4  | VR91   | V14 | ½CV181 |
| V5  | ½VR54  | V15 | VR116  |
| V6  | ½VR54  | V16 | ½VR54  |
| V7  | ½VR54  | V17 | ½VR54  |
| V8  | ½VR54  | V18 | ½CV181 |
| V9  | VR91   | V19 | VR91   |
| V10 | ½CV181 |     |        |

The negative front of the negative locking pulse fed to the cathode of diode V1 at 1 cuts off the current in the valve V2 by reducing its outer control grid voltage. Consequent increase of anode voltage causes the grid, and therefore the cathode of the valve V3, which were negatively biassed, to go positive, thus allowing the valve V4 to conduct. Feedback between the point 3 in the anode circuit of valve V4 and the grid of this valve by the condenser C1 causes this point to fall linearly until it reaches a voltage only slightly positive relative to earth. The anode voltage of valve V4 is communicated by condenser C2 to the control grid of V2 and cuts off current in this valve, which remains cut off until the sweep has stopped. The diode V5 prevents the grid of valve V5 being driven negative by more than 11 volts, so that when the sweep stops and the grid of V2 starts to recover towards the 300 volt line 4 it only has to recover a few volts before the valve V2 become conducting again and the circuit reverts to its initial condition. The point 3 starts to rise towards the 400 volt line 5 but is stopped at 300 volts by the diode V6. The voltage of the point 6 is determined by a circuit to be described later, and in between sweeps the diode V7 holds the point 7 at the same voltage. When the voltage of the point 3 falls to that of the point 7 the diode V8 starts to conduct, so that the point 7 is also carried down positively. This reduces the voltage of the point 8 (which was previously held at earth potential by grid current in V9) and cuts off current in this valve. Current previously flowing into this valve is now diverted into the condenser C3 so that the voltage on the point 9 starts to rise. This rise is fed by the cathode follower V10 and condenser C4 to the cathode of the diode V11 and the upper end of the resistance R1 maintaining a constant voltage across R1 and therefore a constant rate of change of voltage on the point 9. The sweep continues till it is stopped by the diode V12 when the point 9 reaches 300 volts. The sweep on points 3 and 9 with the component values shown, occupy about 300 and 40 microseconds respectively. These two points are connected to the opposite deflecting plates of the cathode ray tube K, and produce a sweep of 300 microsecs. duration with a fast portion lasting 40 microsecs. occurring at a position determined by the voltage on the line 6. In Figure 2 the voltages on the points 3, 6, 7, 8 and 9 shown in Fig. 1 are shown on the same voltage and time scales. As the deflecting plates of the cathode ray tube each cover the range of about 0 to +300 volts the final anode is held at the mean of these voltage, namely +150 volts. The strobe is applied at 2 to the grid of valve V15 at a short and fixed or slowly changing delay after each locking pulse, and the remaining circuits in Fig. 1 are provided to ensure that the voltage on the point 6 is adjusted to such a value that the fast time base sweep is always timed so that it will have completed about a quarter of its sweep when the strobe occurs.

Figure 3:
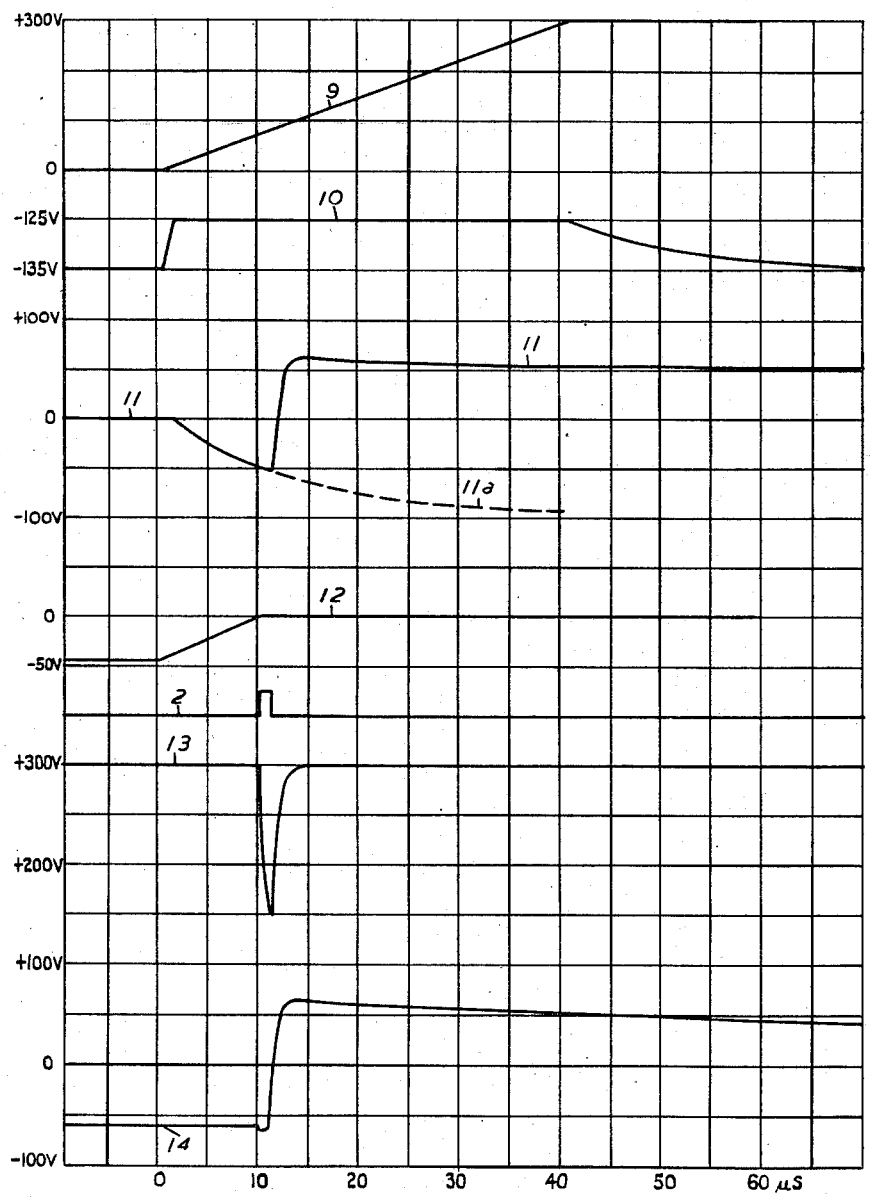
Figure 4:
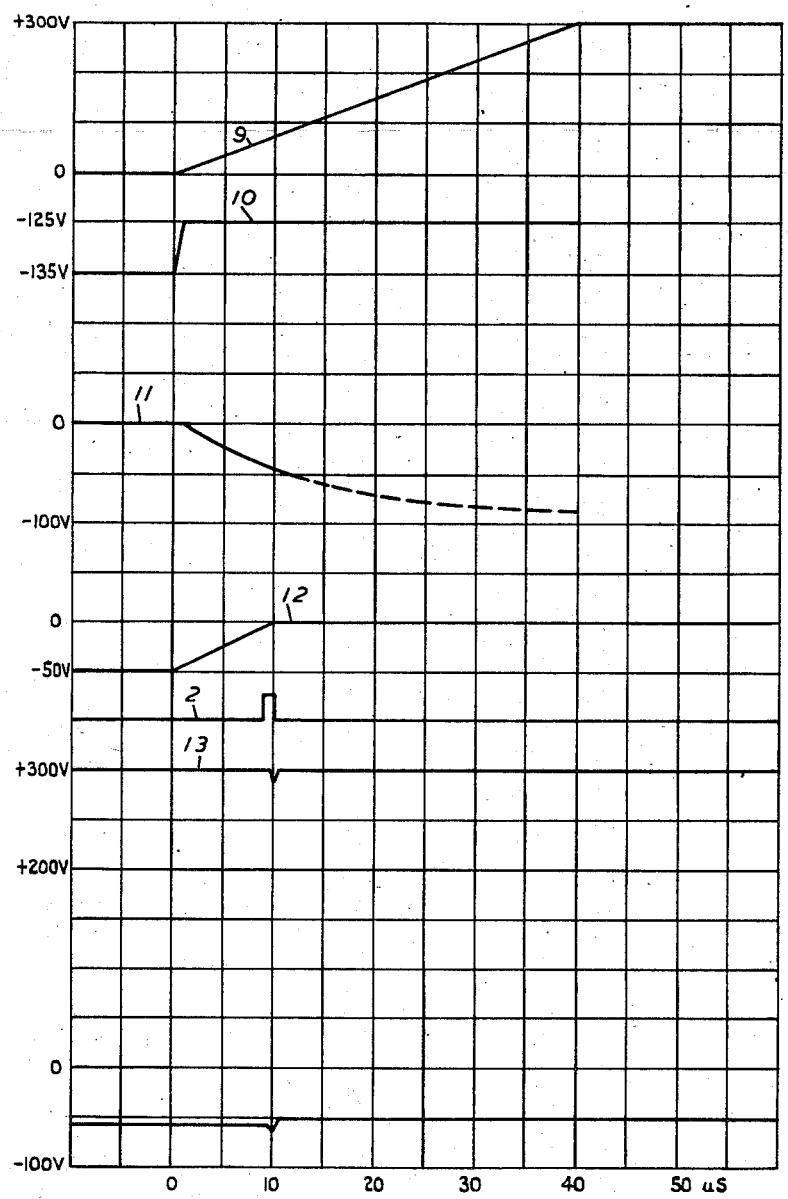

Figure 3 shows further waveform diagrams on a different time scale, giving the waveforms which are obtained when the voltage of the point 6 is such that the fast time base starts too early, and Fig. 4 shows the waveforms obtained when the fast time base starts too late.

The fast sweep voltage occurring at the cathode of V10 is differentiated in the circuit C5, R4 so that the point 10 is brought up to the potential of the cathode of V13 and this valve is rendered conducting. At this time the valve V14 will not be conducting and the point 11, starting from whatever it may happen to be at, will approach a voltage near to −125 at a rate determined by the product R5C6. If the valve V14 remained non-conducting the point 11 would follow the dotted curve 11a in Fig. 3.

The resistances R2 and R3 are so chosen that when the point 9 has completed about a quarter of its sweep the point 12 rises to a voltage at which the outer control grid of V15 permits this valve to pass current. Fig. 3 shows at 12 the voltage on the outer control grid of V15, which, as the sweep is here assumed to occur too early, reaches cathode potential at the beginning of the strobe at 2. Further increase in the voltage of this point is prevented by the diode V16. During the strobe the valve V15 produces a negative pulse at 13. The negative-going leading edge of this negative pulse is transmitted through the condenser C7, but point 14 falls by an amount just sufficient to cause the diode V17 to conduct and remains at a potential a little negative with respect to the anode of V17, with diode V17 just conducting, until the positive going trailing edge of the pulse at 13, transmitted through the condenser C7, causes point 14 to move positive, thereby cutting off diode V17. The resultant positive impulse at 14 causes the valve V14 to conduct and raises the voltage of the point 11 to a value determined by the pulse amplitude at 13. During the remainder of the time for which the valve V13 is conducting the voltage at 14 decays only slowly and consequently at the end of the sweep the voltage at 11 has only dropped slightly. The valve V13 then becomes non-conducting and the point 11 then remains at substantially the same voltage until the next fast sweep is produced, although by this time the point 14 will have returned substantially to the bias of −60 volts. The positive voltage at 11 is fed by the cathode follower V18 to the integrating valve V19. The anode of this valve provides the voltage 6 which in turn determines the timing of the fast time base sweep. As a result of a positive voltage at 11 the point 6 will fall at a rate proportional to this voltage, and for most rapid correction the rate of fall of voltage at 6, produced by a given discrepancy between the timing of the fast portion and the strobe, should be such as to remove this discrepancy in the time between recurrences. If the correction is too small the circuit will take an unnecessarily long time to settle down, but if it is too great the correction will over-shoot, and in extreme cases the system may become unstable. Figure 4 shows the waveforms corresponding to these in Figure 3 which will be produced if the fast time base is too late. In this case the valve V15 will only pass a very small pulse of current and consequently only a small positive step will be produced at 14, this point in fact still remaining negative with respect to earth. The point 11 is thus held only when it reaches a negative voltage, so that the point 6 will rise in voltage and so correct the error.

I claim:

1. A cathode ray tube display system comprising a cathode ray tube, means for producing a slow time-base voltage sweep starting coincident with a recurrent locking front, means for producing a fast time-base voltage sweep of substantially shorter duration than said slow time-base voltage sweep and initiated so as to embrace a repetitive input pulse, potential regulating means for producing a potential that varies when the repetitive input pulses vary their relative time spacings with respect to the start of their complementary fast time base sweeps, and means responsive to the magnitude of said potential to vary the time spacing between the starting instants of the slow and fast sweeps until said potential attains a predetermined value and means for deflecting the electron beam of said cathode ray tube in accordance with the sum of said two time-base voltages.

2. A cathode ray tube display system comprising a cathode ray tube, means for producing a slow time-base voltage sweep in one direction and initiated in synchronism with a recurrent input voltage, means for producing a fast time-base sweep in the opposite direction and of substantially shorter duration than said slow time-base voltage sweep, means for applying the said voltage sweeps to opposite deflecting plates of said cathode ray tube, other deflecting plates for the cathode ray tube, means for applying a second repetitive input pulse voltage to said other plates, means for producing a control voltage which varies according to the time difference between the second input pulse voltages and the occurrence of a predetermined intermediate voltage of the fast time base sweep, and means responsive to the magnitude of said control voltage for varying the starting time of the fast time base sweep until said control voltage attains a predetermined value.

3. In a time base circuit, in combination, first and second input circuits for respectively receiving complementary pulses of spaced pulse pairs; a first sweep generator responsive to the first input for producing a linearly decreasing sweep potential; a second sweep generator including control means which when actuated by a predetermined potential starts a sweep of shorter duration than the first-named sweep; an electron discharge device having a cathode, first and second grids, and an anode; means connecting the output of the second sweep generator to said second grid; the electron discharge device being so constructed and arranged as to be non-conducting when the potential of the second grid is below a predetermined value; means connecting the second input to said first grid; means for applying a source of power between the anode and the cathode; a condenser; means for charging said condenser when the discharge device passes current; means for producing a control potential for controlling the starting time of the next second sweep according to the state of charge of said condenser; means applying said predetermined potential to the second sweep generator when the potential of the first sweep generator falls below the said control potential; and means for combining the sweep potentials of the two sweep generators.

4. In an indicating system, in combination, a first sweep generator having an input for receiving pulses to initiate sweeps by said generator, a second sweep generator which completes each sweep action thereof in less than half the time of a complete sweep of the first generator, means for combining the outputs of said sweep generators; and control means to control the time of occurrence of the sweep of the second generator and to superimpose its sweep on to that of the first generator, said control means comprising all of the following parts: an electron discharge device having an anode, a cathode and first and second grids, means to control the potential on one of said grids to render the discharge device non-conducting until the sweep of the second generator has changed a predetermined amount, a second pulse input circuit comprising means to apply a positive potential on the other of said grids when a pulse is received by the second pulse input circuit, means for applying a potential across the cathode and anode of said discharge device, and means controlled by the current passing through said discharge device for modifying the time spacing between the start of the sweep of the first generator and the start of the sweep of the second generator.

5. In an indicating system, in combination, first and second recurrent pulse sources the second of which supplies one pulse for each pulse from the first source and spaced in time therefrom, a first sweep generator connected to the first source and having its sweep initiated thereby, said first sweep generator having a sufficiently long sweep time as to continue its sweep beyond the time of occurrence of a pulse from the second source, a second sweep generator for modifying the sweep of the first generator to increase the sweep rate over a predetermined percentage of the first-named sweep, and means controlled by the time spacing between complementary pulses from the first and second sources to control the time of occurrence of the increased sweep rate and to cause the latter to overlap the occurrence of pulses from the second source.

6. The combination of claim 5 including a cathode ray tube having first and second ray deflecting elements at right angles to each other, means for impressing the aforesaid sweeps on said first element, and means for impressing pulses from the second source on the second element.

7. In a time base circuit, in combination, first and second pulse input circuits arranged to receive complementary pulses of slowly varying time spacings, a first sweep generator connected to the first input circuit and including means for producing a time base sweep in response to each pulse received by the first pulse input circuit, a second sweep generator for producing a sweep of less than half the duration of the first named sweep, means combining the outputs of said sweep generators, means responsive to pulses received in the second pulse input circuit for producing a control voltage when such pulses occur during predetermined portions of the second sweep, and means responsive to the potential output of the first sweep generator for controlling the starting time of the next of the recurring second sweeps, the last-named means including control means for modifying such starting time according to the value of said control voltage.

8. In a time base circuit, in combination, first and second input circuits for respectively receiving pairs of complementary pulses with the pulses of each pair being impressed on said circuits respectively; a first sweep generator including means for starting its sweep when a pulse is received by the first circuit; a second sweep generator which produces a sweep of shorter duration than that of the first sweep generator; an electron discharge device having a cathode, first and second grids, and an anode; said electron discharge device being substantially non-conducting as long as the potential of the second grid is below a predetermined value; means connecting the output of the second sweep generator between the second grid and cathode, the second sweep generator including means to give the same such a sweep of potential that it reaches said predetermined value at a time spaced from both the beginning and end of the sweep; means connecting the second input circuit to the first grid; means applying a direct current potential between said anode and said cathode; a condenser; means for charging said condenser according to the flow of current in said discharge device; and means responsive to the potential on said condenser to increase the time spacing between the sweeps by delaying the start of the next occurring second sweep when said condenser is charged.

9. In a sweep generator for producing an expanded sweep portion which overlaps the occurrence of pulses which recur at a substantially constant repetition rate and are time spaced from complementary pulses, in combination, a first sweep generator for producing a sweep potential in response to each of said complementary pulses, a second sweep generator which generates one sweep for each sweep of the first-named generator and completes such sweep in less than half the time of the first-named sweep, means for combining the outputs of said sweep generators, and control means to control the time spacing between the start of the first sweep and the start of the second sweep, said control means comprising all of the following parts: discharge means having first and second grids for controlling the same, means for biasing the first grid to cut-off during a predetermined portion of the second-named sweep, means for rendering the second grid positive in response to each first-named pulse, and means responsive to the output of the discharge device for controlling the second sweep generator to vary the starting time of the sweep thereof in accordance with the output of the discharge device.

10. The circuit of claim 7 in which the control means includes means for producing a second control voltage varying with the first one and for starting the second sweep when the potential of the first sweep drops below that of the second control potential.

FRANK E. J. GIRLING.

REFERENCES CITED

The following references are of record in the file of this patent:

UNITED STATES PATENTS

| Number | Name | Date |
| --- | --- | --- |
| 2,215,197 | Sherman | Sept. 17, 1940 |
| 2,300,189 | Wolff | Oct. 27, 1942 |
| 2,368,449 | Cook | Jan. 30, 1945 |
| 2,453,711 | Isbister et al. | Nov. 16, 1948 |